United States Patent [19]

Sigl et al.

[11] Patent Number: 5,129,496
[45] Date of Patent: Jul. 14, 1992

[54] AUTOMATIC LOCKING BRAKE

[75] Inventors: Alfred Sigl, Sersheim; Wolf-Dieter Jonner, Beilstein-Schmidhausen, both of Fed. Rep. of Germany

[73] Assignee: Robert Bosch GmbH, Stuttgart, Fed. Rep. of Germany

[21] Appl. No.: 460,942

[22] PCT Filed: Aug. 17, 1988

[86] PCT No.: PCT/EP88/00732
§ 371 Date: Feb. 28, 1990
§ 102(e) Date: Feb. 28, 1990

[87] PCT Pub. No.: WO89/01887
PCT Pub. Date: Mar. 9, 1989

[30] Foreign Application Priority Data

Aug. 28, 1987 [DE] Fed. Rep. of Germany ....... 3728709

[51] Int. Cl.$^5$ .......................... B60T 7/12; B60K 41/20
[52] U.S. Cl. ................................ 192/0.049; 192/1.23;
192/1.33; 192/13 A

[58] Field of Search .................. 192/1.23, 1.35, 0.049,
192/0.094, 1.31, 1.32, 1.33, 13 A; 364/426.01;
303/93

[56] References Cited

U.S. PATENT DOCUMENTS

| 4,131,325 | 12/1978 | Bayliss | 303/93 |
| 4,446,950 | 5/1984 | Wise et al. | 192/4 A X |
| 4,708,406 | 11/1987 | Takagi et al. | 192/1.33 X |
| 4,717,207 | 1/1988 | Kubota et al. | 364/426.01 X |
| 4,802,562 | 2/1989 | Kuroyanagi et al. | 192/1.23 |

FOREIGN PATENT DOCUMENTS

| 3540305 | 5/1986 | Fed. Rep. of Germany . |
| 3709157 | 10/1987 | Fed. Rep. of Germany . |
| 60-42148 | 3/1985 | Japan . |
| 61-129356 | 6/1986 | Japan . |

*Primary Examiner*—Rodney H. Bonck
*Attorney, Agent, or Firm*—Felfe & Lynch

[57] ABSTRACT

Brake pressure is increased when the brake pedal is operated and the vehicle falls short of a very slow reference speed $v_x$, which value is variable and increases as the vehicle deceleration increases. The pressure is maintained until the throttle is applied.

18 Claims, 1 Drawing Sheet

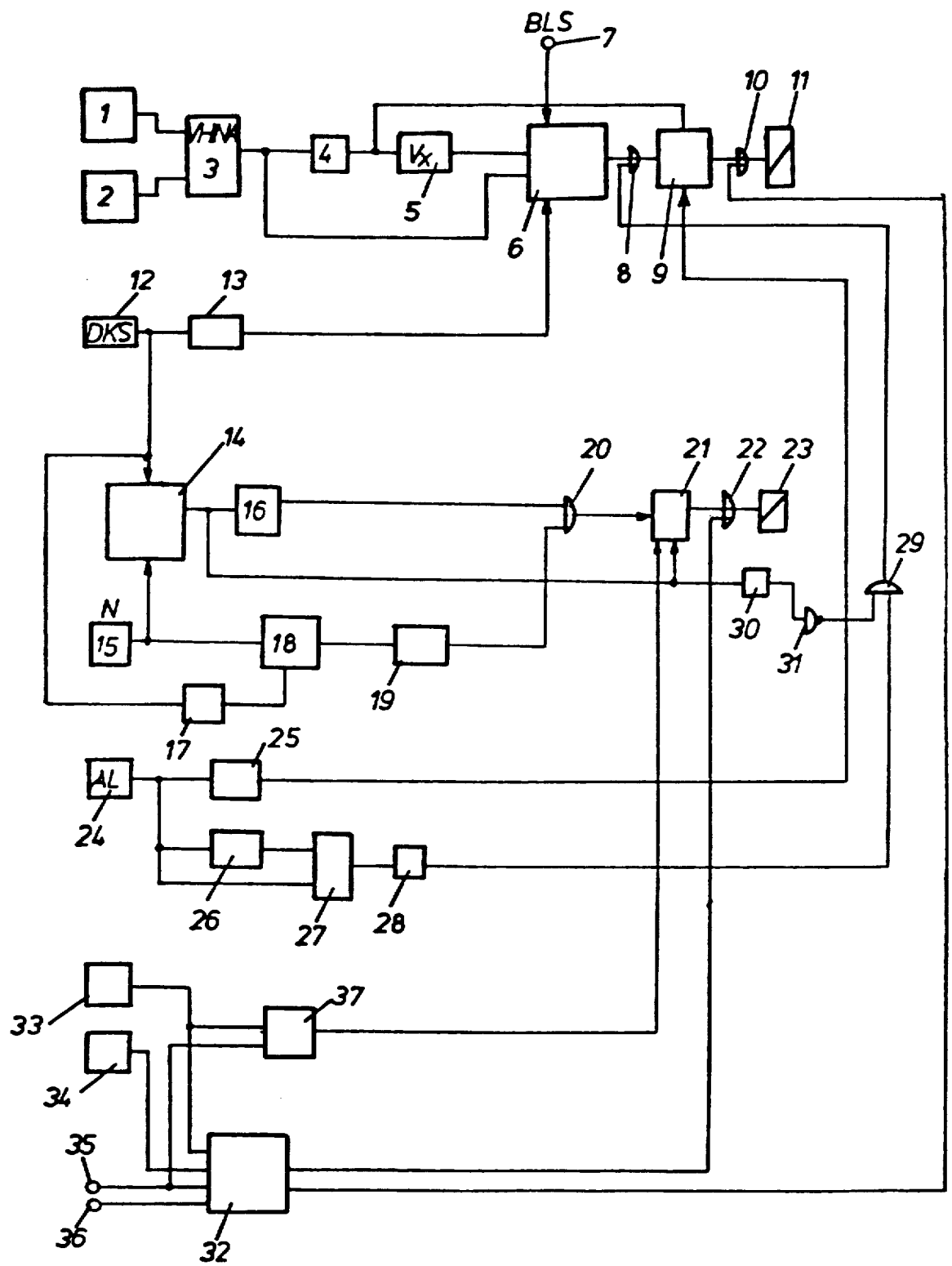

AUTOMATIC LOCKING BRAKE

BACKGROUND OF THE INVENTION

The invention relates to a brake control system for automatically applying a braking pressure when the vehicle speed drops below a very low speed value and the brake pedal is operated, and maintaining that pressure until the vehicle is driven off again.

U.S. Pat. No. 4,684,177 discloses an automatic locking brake during the use of which a valve is activated when operating the brake and the clutch pedal. This valve permits maintaining the applied brake pressure even after the release of the brake. When the clutch pedal is released followed by an immediate pressing of gas pedal, the pressure is reduced. The use of a speed signal ensures that there is no pressure increase while the vehicle is in motion.

From German OS 35 12 716 it is known to gradually increase the brake pressure in case the vehicle speed is zero and the brake pedal is pressed down.

SUMMARY OF THE INVENTION

According to the invention, a low reference speed value $v_x$ at which the brakes are automatically applied is variable and dependent on the deceleration in such a way that the speed value $v_x$ increases as the deceleration increases. On the one hand, the transition from braking by means of the regular brake to employing the locking brake must not be noticed by the operator of the vehicle; on the other hand, the locking brake must take effect immediately after the vehicle has been brought to a complete stop. It is an essential improvement to include the vehicle deceleration when determining the start of the brake pressure build-up and when calculating the pressure build-up rate.

Considering the throttle position (TP) for prompting a sequence of pressure decrease pulses when releasing the locking brake does not always result in satisfactory transition characteristics. A substantial improvement can be achieved by calculating the instantaneous drive capacity from a characteristics field $\tau_d = f(TP, RPM)$ and additionally allowing for engine dynamics, e.g. by means of a first-order time delay.

The pulsing down is then not prompted by a prescribed position of the throttle but by a prescribed threshold $\tau_x$ of driving torques or engine loads. Moreover, high engine torques cause a more rapid pressure decrease.

A pressure decrease is triggered if $r_d > R_x$ and the pauses of the decrease pulse sequence is measured, for example, according to:

$$t_{pause} = \frac{K_4}{T_d}$$

In vehicles with a manual shift transmission, the beginning and the course of the pressure release often occur incorrectly. This can be improved in two ways:

1. evaluating the distance covered by the clutch pedal including a learning condition for a point of action; or, combined with ASR, the
2. evaluating the engine speed and the position of the throttle.

In the latter case, the engine speed is calculated from the throttle position by means of a simple engine model and prescribed parameters for the load-free engine. If the engine speed (RPM) measured is substantially lower or shows a strongly decreasing tendency, this is a sign of a clutch engaging (additional engine load). Hence a pressure decrease is prompted at $(r_d > T_x)$ $(RPM_{measured} << RPM_{calculated})$.

In an ASR and ABS a so-called longitudinal accelerometer or a combination of two sensors (each having an angle of inclination of 45%) is used to determine the road gradient. The pressure required for locking a vehicle is approximately proportional to the road gradient. Calculating the pressure to be supplied by making use of the road gradient is hence efficient and essential for a best-possible pressure decrease when departing. This can be carried out, for example, by determining the number of pressure build-up pulses. (Number of pressure build-up pulses = K5 gradient).

The presently used wheel speed sensors operate only after a certain minimum speed. In case the vehicle starts moving although the locking brake is applied, this can first be detected by means of the acceleration signal. If the vehicle acceleration signal changes when the operator releases the brake, for example, (BLS decrease), it is advantageous to increase the pressure for the locking brake (until the old acceleration value is reestablished).

In case a drive slippage occurs, the pressure decrease is preferably stopped or strongly slowed down until the ASR takes effect, for example, by varying the duration of the build-up pulses:

$$t_{pulse} = K_6 \frac{1}{V_d - V_{nd}}$$

whereby $t_{pulse}$ can vary between 3 and 5 msec, for example. The departing characteristics of ASR can thus be improved since the drive slippage is also limited in the first ASR-control cycle. A locking brake is hence also advantageous for vehicles with an automatic transmission.

Instead of evaluating the vehicle speed, it is also possible to evaluate the speed $V_d$ of the driven wheel or the speed $V_{nd}$ of the non-driven vehicle wheel. $V_{nd}$ replaces the speed $V_{veh}$ which has been used so far. $V_d$ serves to evaluate the drive slippage.

BRIEF DESCRIPTION OF THE DRAWING

The sole FIGURE is a diagram of the brake lock system.

DETAILED DESCRIPTION OF THE PREFERRED EMBODIMENT

Wheel speed sensors 1, 2 are associated with the non-driven wheels of a vehicle. From the signals they provide, a reference value is generated in a block 3 in a known way; this reference value is approximated to the course of the vehicle speed $V_{veh}$. A vehicle deceleration $\dot{V}_{veh}$ is recovered in a differentiator 4 and supplied to a block 5 in which the expression $$V_x = K_1 \dot{V}_{veh} - K_2$$

is formed, whereby $K_1$ and $K_2$ are constants. This value is supplied to a comparator 6 which compares the vehicle speed to a low velocity comparator value $V_x$ and supplies a signal when $V_{veh} \leq V_x$ and, additionally, a brake light signal (BLS) switch is coupled in via a terminal 7 and the throttle is in the 0-position. A sensor 12 signals the throttle position (TP) to a downstream threshold stage 13 with a threshold value close to 0.

The output signal of the comparator 6 activates a pulse generator 9 the pulses of which actuate an inlet valve 11 which in turn discontinuously connects a brake pressure generator to the brakes. The vehicle deceleration signal is supplied to the pulse generator 9 and the latter measures the pauses $t_{pause}$ between the pulses to $$t_{pause} = \frac{K_3}{V_{veh}}$$

wherein $K_3$ is a constant.

$V_x$ is preferably limited to 5 km/h, for example, and in case of an active ABS it must not exceed approximately 1 km/h.

The characteristics field $\tau_d = f(TP, RPM)$ is stored in a block 14. When entering a signal TP from the sensor 12 indicating the instantaneous throttle position and a signal N form a sensor 15 indicating the instantaneous speed of the engine, a certain drive torque results from the characteristics field; the corresponding signal is supplied to a threshold stage 16 which supplies a signal after surpassing a threshold $\tau_x$. In a block 17 a signal corresponding to the load-free engine speed is formed from the throttle position and known engine parameters. In a comparator 18, this calculated engine speed signal is compared to the measured engine speed signal. A threshold stage 19 supplies a signal to an AND-gate 20 when the measured engine speed is smaller than the calculated engine speed by a great amount.

If a signal is supplied to both inputs of the AND-gate a pulse sensor 21 is activated which actuates an outlet valve 23 thus triggering a pulsed brake pressure reduction. The drive torque $\tau_d$ is supplied to the pulse generator 21 and the latter measures the pauses $t_{pause}$ between the pulses according to the relation $$t_{pause} = \frac{K_4}{T_d}$$

whereby $K_4$ is a constant.

In addition, the road gradient can be measured and be included in the measurement of the pressure supplied. A longitudinal accelerometer 24 is provided for this purpose. In a downstream block 25 a signal which depends upon the gradient is formed and supplied to the pulse generator 9. This signal determines the number of pressure build-up pulses to be supplied by the pulse generator 9. If the vehicle is set into motion, the output signal of the longitudinal accelerometer 24 changes. This change is detected by means of a memory 26 and a comparator 27. If the low threshold of a threshold sensor 28 is surpassed, a signal is released which, provided a signal is supplied to the second input of an AND-gate 29, is supplied via an OR-gate 8 to the pulse generator 9 activating the latter again and thus building up pressure.

Because of an inversion element 31, the AND-gate 29 receives a signal at the second input when the drive torque falls below the threshold value of a threshold stage 30 and, hence, the threshold stage does not supply a signal.

A block 32 represents the electronic unit of the drive slippage control of the vehicle. The speed signals which are derived from the driven wheels by means of the sensors 33 and 34 and the signals of the sensors 1 and 2 associated with the non-driven wheels are supplied (via terminals 35 and 36) to this block 32. The brake pressure control signals which are formed in the electronic unit 32 are via OR-gate 10 and 22 supplied to the valves.

In a block 37 (shown for only one pair of wheels) an additional signal is recovered which follows the relation $$t_{pulse} = K_6 \frac{1}{V_d - V_{nd}}$$

($V_d$ speed of driven wheel, $V_{nd}$ speed of non-driven wheel, $K_6$ constant). This signal is supplied to a pulse generator 21 which correspondingly measures the width of the pulses $t_{pulse}$ of the pressure build-up pulses; hence, it reduces the width of the pulses when a drive slippage is generated thus reducing the speed of the pressure reduction.

The invention can also be realized in that when reaching a small vehicle reference speed, e.g. 10 km/h, the measured vehicle deceleration, is used to calculate when the vehicle will come to a complete stop when maintaining the deceleration and that at this calculated point in time, the brake pressure is supplied and maintained. In addition, this calculating and supplying procedure can be made dependent upon operation of the brake.

We claim:

1. System for automatically locking the brake of a vehicle when the brake pedal is applied at low speed, comprising
    means for determining the speed of the vehicle,
    means for determining the deceleration $v_{veh}$ of the vehicle,
    means for calculating a speed value $v_x$ from the deceleration $v_{veh}$ of the vehicle such that $v_x$ increases as the deceleration $v_{veh}$ increases, and
    means for automatically applying pressure to the brake of the vehicle when the speed of the vehicle is less than the speed value $v_x$ and the brake pedal is applied.

2. System as in claim 1 wherein said means for calculating a speed value $v_x$ calculates $v_x$ according to the relation $v_x = K_1 \dot{v}_{veh} - K_2$, where $K_1$ and $K_2$ are constants.

3. System as in claim 1 wherein said means for automatically applying pressure to the brake increases the brake pressure at a rate which increases with an increasing vehicle deceleration.

4. System as in claim 3 wherein said means for automatically applying pressure to the brake increases brake pressure in pulses and maintains said pressure constant during pauses having a duration between said pulses, the duration of said pauses decreasing with increasing vehicle deceleration.

5. System as in claim 1 further comprising
    means for determining instantaneous drive torque of the vehicle and
    means for reducing pressure to the brake of the vehicle when the instantaneous drive torque exceeds a predetermined threshold torque.

6. System as in claim 5 wherein said means for reducing pressure to the brake reduces the brake pressure at a rate which increases with an increasing drive torque.

7. System as in claim 6 wherein said means for reducing pressure to the brake reduces brake pressure in pulses and maintains brake pressure constant during pauses having a duration between said pulses, the duration of said pauses decreasing with increasing drive torque.

8. System as in claim 5 further comprising means for determining throttle position and means for determining engine speed, said means for determining instantaneous drive torque determining said drive torque from said throttle position and said engine speed.

9. System as in claim 5 for a vehicle having a clutch, said system further comprising means for determining clutch operation, said means for reducing pressure to the brake reducing said pressure when said instantaneous drive torque exceeds a predetermined threshold torque and the clutch is operated.

10. System as in claim 9 wherein said means for determining clutch operation comprises means for determining actual engine speed.

11. System as in claim 10 wherein said means for determining clutch operation further comprises
means for determining throttle position,
means for calculating load-free engine speed from said throttle position, and
means for determining when the actual engine speed falls below the load-free engine speed by a predetermined amount.

12. System as in claim 5 further comprising means for determining road gradient, said means for automatically reducing pressure to the brake reducing said pressure at a rate dependent upon said road gradient.

13. System as in claim 12 wherein said means for automatically applying pressure to the brake increases brake pressure in pulses, the number of pulses being dependent upon the road gradient.

14. System as in claim 12 further comprising means for determining release of the brake pedal, said means for determining road gradient comprising a longitudinal accelerometer having an output, said means for automatically applying brake pressure increasing said brake pressure when the brake pedal is released and a change in said output occurs.

15. System as in claim 5 for a vehicle having a drive slip control, said system further comprising means for determining drive slippage, said means for reducing pressure to the brake reducing said pressure at a rate which decreases when drive slippage is determined.

16. System as in claim 5 wherein said means for reducing brake pressure reduces brake pressure in pulses having a duration which decreases with increasing drive slip.

17. System as in claim 1 for a vehicle having a drive slip control and a brake pressure supply for said drive slip control, said means for automatically applying pressure to the brake comprising said brake pressure supply for said drive slip control.

18. System as in claim 1 further comprising means for determining throttle position of the vehicle, said means for automatically applying pressure to the brake applying pressure when the speed of the vehicle is less than the speed value $v_x$ and the brake pedal is applied and the throttle position is less than a threshold value.

* * * * *

UNITED STATES PATENT AND TRADEMARK OFFICE
CERTIFICATE OF CORRECTION

PATENT NO. : 5,129,496

DATED : July 14, 1992

INVENTOR(S) : Alfred Sigl et al.

It is certified that error appears in the above-identified patent and that said Letters Patent is hereby corrected as shown below:

Column 1, line 50, delete "$r_d > R_x$" and insert --$\tilde{T}_d > \tilde{T}_x$--

Column 2, line 5, delete "$r_d > T_x$" and insert --$\tilde{T}_d > \tilde{T}_x$--

Column 3, line 20, delete "N form a" and insert --RPM from the--

Column 3, line 35, delete "$r_d$" and insert --$\tilde{T}_d$--.

Signed and Sealed this

First Day of February, 1994

Attest:

BRUCE LEHMAN

Attesting Officer

Commissioner of Patents and Trademarks